US009019313B2

(12) United States Patent
Kwack et al.

(10) Patent No.: US 9,019,313 B2
(45) Date of Patent: Apr. 28, 2015

(54) FLEXIBLE DISPLAY DEVICE

(75) Inventors: Jun-Ho Kwack, Yongin (KR); Dae-Won Kim, Yongin (KR); Young-Sik Kim, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 184 days.

(21) Appl. No.: 13/426,478

(22) Filed: Mar. 21, 2012

(65) Prior Publication Data

US 2013/0127917 A1 May 23, 2013

(30) Foreign Application Priority Data

Nov. 18, 2011 (KR) ........................ 10-2011-0120915

(51) Int. Cl.

| | |
|---|---|
| ***G09G 5/00*** | (2006.01) |
| ***G06F 3/041*** | (2006.01) |
| ***G03B 21/56*** | (2006.01) |
| ***G06F 1/16*** | (2006.01) |

(52) U.S. Cl.

CPC .... *G06F 1/1652* (2013.01); *G06F 2203/04102* (2013.01)

(58) Field of Classification Search

None

See application file for complete search history.

(56) References Cited

U.S. PATENT DOCUMENTS

| | | | | |
|---|---|---|---|---|
| 2008/0150885 | A1* | 6/2008 | Overwijk et al. | 345/107 |
| 2010/0033435 | A1* | 2/2010 | Huitema | 345/173 |
| 2010/0315381 | A1* | 12/2010 | Yi et al. | 345/175 |

FOREIGN PATENT DOCUMENTS

| | | | |
|---|---|---|---|
| KR | 10-2006-0070535 | A | 6/2006 |
| KR | 10-2010-0027502 | A | 3/2010 |
| KR | 1020080086442 | * | 11/2010 |
| KR | 10-2011-0048705 | A | 5/2011 |

* cited by examiner

*Primary Examiner* — Joni Richer
*Assistant Examiner* — Yi Wang
(74) *Attorney, Agent, or Firm* — Knobbe Martens Olson & Bear, LLP

(57) ABSTRACT

A display device includes a flexible display including a flexible display panel and a flexible touch panel, and a housing configured to enclose the flexible display while allowing the flexible display to move relative to the housing such that a portion of the flexible display is drawn out of the housing and retracted into the housing. The display device further includes a marker configured to contact a location of the flexible touch panel when a portion of the flexible display is drawn out of the housing. The marker is provided such that the contact location changes as the flexible display moves relative to the housing. The display device also includes at least one processor configured to compute the contact location on the flexible display and to adjust the size of an image displayed on the flexible display panel based on the computed contact location.

16 Claims, 6 Drawing Sheets

200
DA
300
100
110
120
400
Controller
First direction

FLEXIBLE DISPLAY DEVICE

RELATED APPLICATIONS

This application claims priority to and the benefit of Korean Patent Application No. 10-2011-0120915 filed in the Korean Intellectual Property Office on Nov. 18, 2011, the entire contents of which are incorporated herein by reference.

BACKGROUND

1. Field

The described technology relates generally to a display device and, more particularly, to a display device including a flexible display panel.

2. Description of the Related Art

Display devices are widely used to display images. It is expected that among the display devices, flexible display devices will be used with various devices.

A flexible display device includes a flexible display panel displaying an image. Since the flexible display panel is flexible, the flexible display panel can be folded, wound or rolled up into a roll to thereby reduce the overall size thereof. Thus, it will be easy to carry the flexible display device.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a display device having advantages of displaying an image optimized for flexible characteristics of a flexible display panel.

One aspect provides a display device which comprises: a flexible display comprising a flexible display panel and a flexible touch panel positioned over a display surface of the flexible display panel; a housing configured to enclose the flexible display while allowing the flexible display to move relative to the housing such that a portion of the flexible display is drawn out of the housing and retracted into the housing; a marker configured to contact a location of the flexible touch panel when a portion of the flexible display is drawn out of the housing, wherein the marker is provided such that the contact location changes as the flexible display moves relative to the housing; and at least one processor configured to compute the contact location on the flexible display and to adjust the size of an image displayed on the flexible display panel based on the computed contact location.

In the foregoing device, the marker may be formed over another surface of the flexible display opposite to the display surface, wherein at least a portion of the flexible display may be configured to be wound into a roll portion within the housing, wherein the marker may be brought into contact with the flexible touch panel in the roll portion. The display device may further comprise a shaft on which the at least a portion of the flexible display is wound into the roll portion, wherein the flexible touch panel may comprise a portion which does not overlap with the flexible display panel, the non-overlapping portion having a length measured in a moving direction of the flexible display, wherein the length of the non-overlapping portion may be the substantially same with that of the circumference of the shaft. The marker may have a stripe shape extending in a moving direction of the flexible display.

Still in the foregoing device, the at least one processor may be configured to determine the size of the exposed portion of the flexible display using the contact location such that the size of the image is adjusted using the computed size of the exposed portion. The at least one processor may be configured to determine the size of the exposed portion of the flexible display further using a distance between the contact location and the exposed portion measured in a moving direction of the flexible display. The marker may be secured to the housing at a fixed position relative to the housing. The marker may comprise a conductive brush or a conductive cushion which is configured to contact the flexible touch panel. The contact location may be positioned within the housing. The flexible touch panel may comprise a capacitive touch panel, wherein the marker comprises an electrically conductive surface which is configured to touch the capacitive touch panel.

Another aspect provides a method of operating a display device. The method comprises: providing the foregoing display device; drawing the flexible display out of the housing such that a portion of the flexible display is exposed out of the housing; computing a location on the flexible display at which the marker contacts the flexible touch panel; and processing the computed contact location to adjust the size of an image to be displayed on the exposed portion of the flexible display.

In the foregoing method, processing may comprises: computing the size of the exposed portion based on the computed contact location; and adjusting the size of the image using the computed size of the exposed portion. The method may further comprise adjusting the resolution of the image to adjust the size of the image. The method may further comprise winding the flexible display to retract at least part of the exposed portion into the housing, wherein the contact location is changed while winding the flexible display. The marker may be formed over another surface opposite to the display surface, wherein a portion of the flexible display is wound into a roll within the housing, wherein the marker touches the wound portion. The marker may have a stripe shape extending in a moving direction of the flexible display.

Still in the foregoing method, the marker may be secured to the housing at a fixed position relative to the housing. The contact location may be positioned within the housing while drawing the flexible display. The flexible touch panel may comprise a capacitive touch panel, wherein the marker may comprise an electrically conductive surface which touches the capacitive touch panel.

An embodiment provides a display device including: a flexible display unit including a flexible display panel displaying an image and a capacitive touch panel positioned on an upper surface of the flexible display panel; a housing into which or from which the flexible display unit is drawn such that a display area of the flexible display unit is variably exposed; and a controller connected to the capacitive touch panel and the flexible display panel, the controller matching the size of an image displayed on the flexible display panel to the display area based on capacitance of the capacitive touch panel which changes at the contact location as the flexible display unit is drawn into or drawn out of the housing.

The flexible display unit may further include a conductive marker formed on a rear surface of the flexible display panel, and the display device may further include a roll unit positioned within the housing to support an end portion of the flexible display unit and rolling the flexible display unit therearound such that the conductive marker is brought into contact with the capacitive touch panel.

The capacitive touch panel may have a length as large as a first length in a direction of the roll unit over the flexible display panel.

The first length may be equivalent to the circumference of the roll unit.

The conductive marker may extend in a direction in which the roll unit rotates.

The controller may detect the display area corresponding to a length obtained by subtracting a fourth length from the center of the roll unit to the edge of the housing from a third length excluding a second length of the capacitive touch panel which has been brought into contact with the conductive marker and thus has changed capacitance, in the overall length of the capacitive touch panel.

The display device may further include a conductive contact unit which comes into contact with the capacitive touch panel, wherein the controller may detect the display area corresponding to a portion, of the capacitive touch panel, drawn out of the housing based on a portion which has been brought into contact with the conductive contact unit and thus has changed capacitance.

The conductive contact unit may have a brush-like shape or a cushion-like shape.

According to embodiments, a display device displaying an image optimized for the flexible characteristics of a flexible display panel can be provided.

DETAILED DESCRIPTION

Figure 1:
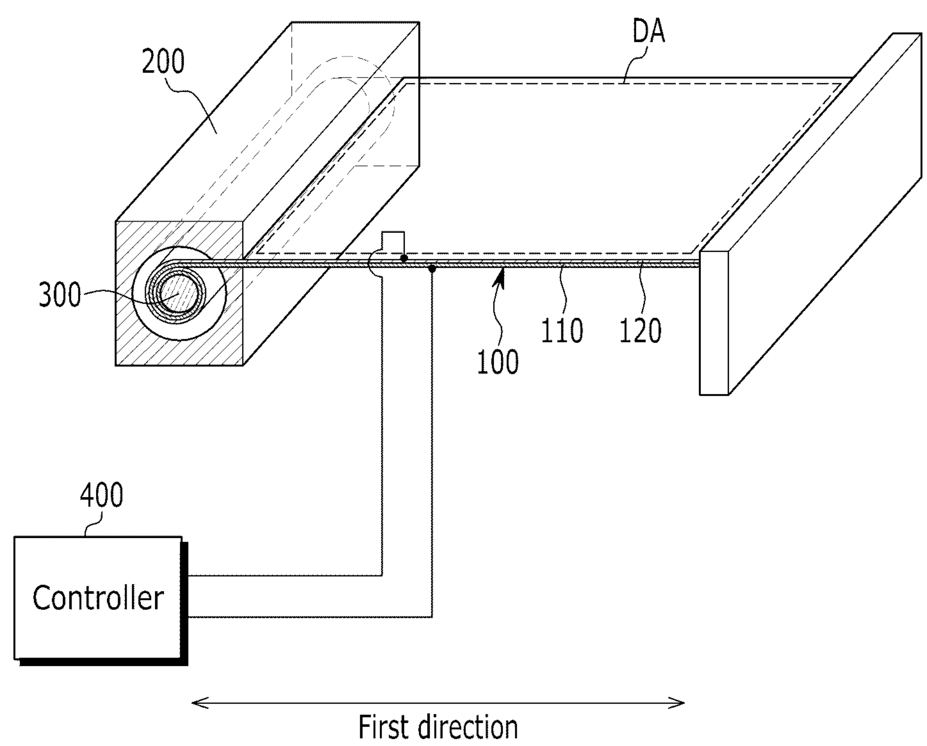
FIG. 1 is a view showing a display device according to an embodiment.

The embodiments will be described more fully hereinafter with reference to the accompanying drawings, in which embodiments of the invention are shown. As those skilled in the art would realize, the described embodiments may be modified in various different ways, all without departing from the spirit or scope of the present invention.

In order to clarify the present invention, parts that are not connected with the description will be omitted, and the same elements or equivalents are referred to as the same reference numerals throughout the specification.

In several embodiments, the same reference numerals are used for the elements having the same configuration to representatively explain the elements in a first embodiment, and only a different configuration from that of the first embodiment will be described in other embodiments.

The size and thickness of each element are arbitrarily shown in the drawings, and the present invention is not necessarily limited thereto.

In the drawings, the thickness of several layers and regions magnified for clarification. In the drawings, the thickness of some of layers and regions are exaggerated for the sake of explanation. It will be understood that when an element such as a layer, film, region, or plate is referred to as being "on" another element, it can be directly on the other element or intervening elements may also be present.

Throughout the specification, unless explicitly described to the contrary, the word "comprise" and variations such as "comprises" or "comprising", will be understood to imply the inclusion of stated elements but not the exclusion of any other elements. Also, throughout the specification, "on" means that an element is positioned on or above or under or below another element and may not necessarily mean that an element is positioned at an upper side of another element based on a gravitation direction.

A display device according to embodiments will be described with reference to FIGS. 1 through 4.

FIG. 1 is a cross-sectional view of a display device according to embodiments.

As shown in FIG. 1, the display device includes a flexible display unit 100, a housing 200, a roll unit or roll shaft 300, and a controller 400.

As shown in FIG. 1, the flexible display unit 100 displays an image processed in the display device. For example, when the display device is a part of a mobile terminal such as a mobile phone, a smartphone, or the like, the flexible display unit 100 may display an image such as a user interface (UI), a graphic user interface (GUI), or the like. The flexible display unit 100 is flexible and can be bended, wound, or rolled up, and the flexible display unit 100 can be pulled or drawn into or out of the housing 200. In embodiments, the flexible display unit 100 is drawn in or out in a first direction as shown in the drawings, when winding the display unit 100 by way of rotating the roll unit or roll shaft 300 with respect to the housing 200 or pulling out the display unit 100. In embodiments, as the flexible display unit 100 is drawn into or drawn out of the housing 200, the size of a display area DA which is exposed out of the housing can vary. In some embodiments, the flexible display unit 100 includes a flexible display panel 110 and a touch panel 120, and a marker 130. In some embodiments, the touch panel may be a capacitive touch panel.

In embodiments, the flexible display panel 110 includes flexible substrates, films, or the like. Liquid crystal, an organic light emitting diode, or the like, is interposed between the flexible substrates to display an image. The flexible display panel 110 may be transparent or light-transmissive to allow the exterior to be viewed therethrough. In embodiments, the capacitive touch panel 120 is positioned on an upper surface of the flexible display panel 110.

In embodiments, The capacitive touch panel 120 may be flexible and have a form of a film, a sheet, a pad, or the like, and may sense a touch operation through a change in capacitance.

The flexible display panel 110 and the capacitive touch panel 120 are connected to the controller 400, respectively, and the controller 400 can include at least one processor to adjust or fit the size of an image to be, displayed on the flexible display panel 110 to the display area DA based on a location at which the capacitance of the capacitive touch panel 120 changes by touching the touch panel at the location with the marker 130 as the flexible display unit 100 is drawn into or drawn out of the housing 200.

Figure 2:
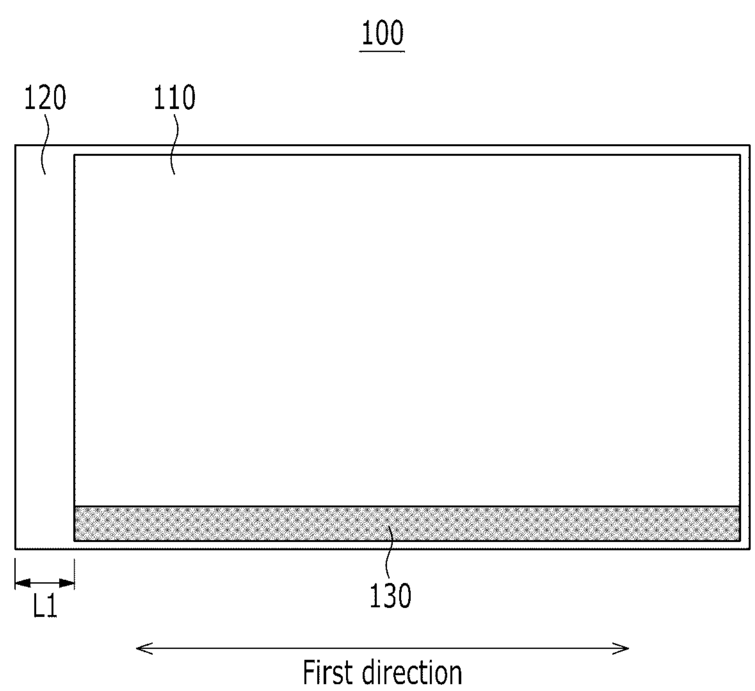
FIG. 2 is a view showing a flexible display unit of the display device according to an embodiment.

FIG. 2 is a view showing the flexible display unit of the display device according to embodiments. FIG. 2 shows a rear side of the flexible display panel of the flexible display unit.

As shown in FIG. 2, the capacitive touch panel 120 has an end portion where the touch panel does not overlap with the display panel. The portion has a first length L1 in a moving direction along the flexible display panel 110 moves with respect to the housing. In embodiments, the first length L1 is equivalent to the circumference of the roll unit 300 such that the end portion can surround the roll unit 300 when the end portion is wound around the roll unit 300 in a single turn. In embodiments, the flexible display unit 100 is supported by the roll unit 200 in a state in which the end portion of the capacitive touch panel 120 is rolled up around the roll unit 300.

In some embodiments, the marker 130 can be electrically conductive or can have a portion which is electrically conductive. Such electrically conductive marker 130 can be formed on the rear surface of the flexible display panel 110. In detail, the conductive marker 130 is formed on the rear surface of the flexible display panel 110 to extend in a first direction in which the flexible display panel 100 is drawn into or drawn out of the housing 200. The conductive marker 130 has electrically conductive characteristics and may be formed by applying a solution having electrically conductive characteristics to the flexible display panel 110 or attaching a tape having electrically conductive characteristics to the flexible display panel 110. As the conductive marker 130 is formed on the rear surface of the flexible display panel 110, when the flexible display unit 100 is rolled up or wound around the roll unit 300, the conductive marker 130 is brought into contact with the capacitive touch panel 120 positioned on an upper surface of the flexible display panel 110.

With reference back to FIG. 1, the housing 200 is a part into which or from which the flexible display unit 100 is drawn such that the display area DA of the flexible display unit 100 is variably exposed. The roll unit 300 is positioned within the housing 200.

The roll unit 300 is positioned within the housing 200 to support an end portion of the flexible display unit 100, and rolls up the flexible display unit 100 therearound. This allows the flexible display unit 100 to be drawn in or out in the first direction with respect to the housing 200. In embodiments, the roll unit 300 selectively rolls up or winds the flexible display unit 100 to variably expose the display area DA of the flexible display unit 100 to the outside of the housing 200. The roll unit 300 may rotate or roll passively or actively by itself, and as the roll unit 300 rotates by itself, the flexible display unit 100 can be drawn in or out in the first direction with respect to the housing 200. As the flexible display unit 100 is rolled up around the roll unit 300, the conductive marker 130 formed on the rear surface of the flexible display panel 110 is brought into contact with the capacitive touch panel 120 positioned on the upper surface of the flexible display panel 110.

The controller 400 is connected to the capacitive touch panel 120 and the flexible display panel 110. The controller 400 determines the display area DA based on the capacitance change of the capacitive touch panel 120 at a location where the conductive marker 130 is brought into contact with the capacitive touch panel 120 when the flexible display unit 100 is drawn into or drawn out of the housing 200 by the roll unit 300, and changes the size of an image displayed on the flexible display panel 110 such that it corresponds to the detected display area DA.

The method for detecting the display area DA based on the capacitance of the capacitive touch panel 120 by the controller 400 will be described with reference to FIG. 3.

Figure 3:
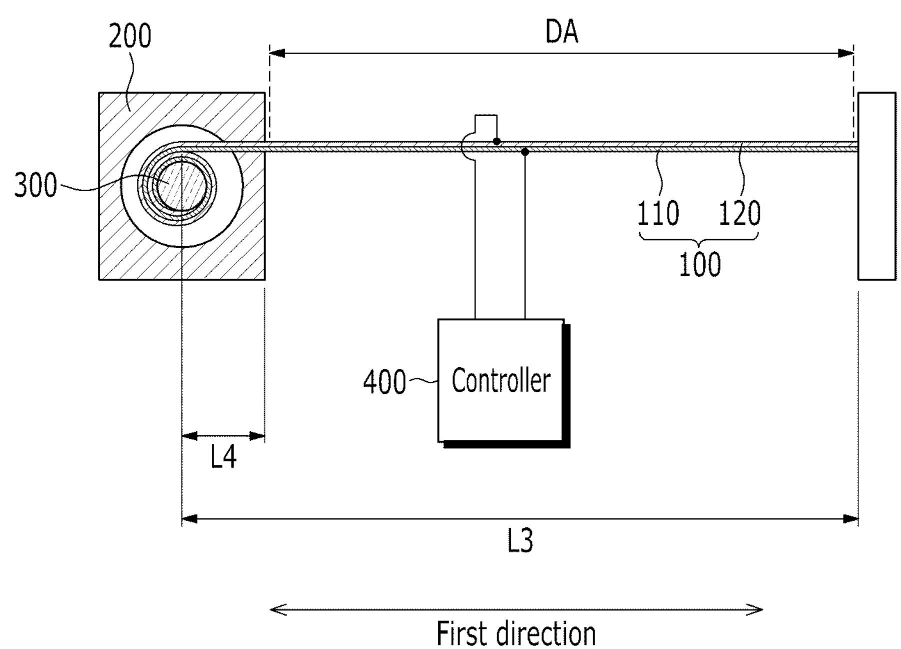
FIG. 3 is a view explaining a method for detecting a display area by a controller in the display device according to an embodiment.

FIG. 3 is a view explaining a method for detecting the display area by the controller in the display device according to the first embodiment.

As shown in FIG. 3, when the flexible display unit 100 is rolled up around the roll unit 300 and drawn into the housing 200, the conductive marker 130 formed on the rear surface of the flexible display panel 110 is brought into contact with the capacitive touch panel 120 positioned on the upper surface of the flexible display panel 110, and the capacitance of the capacitive touch panel 120 of the flexible display unit 100 is changed at a contact location where the marker 130 contacts the touch panel.

In embodiments, the controller 400 detects or determines a display area DA depending on a length obtained by subtracting a fourth length L4 which is a distance between the center of the roll unit 300 to the edge of the housing 200 from a third length L3 which is a distance between the contact location and an end of the flexible display panel.

Figure 4:
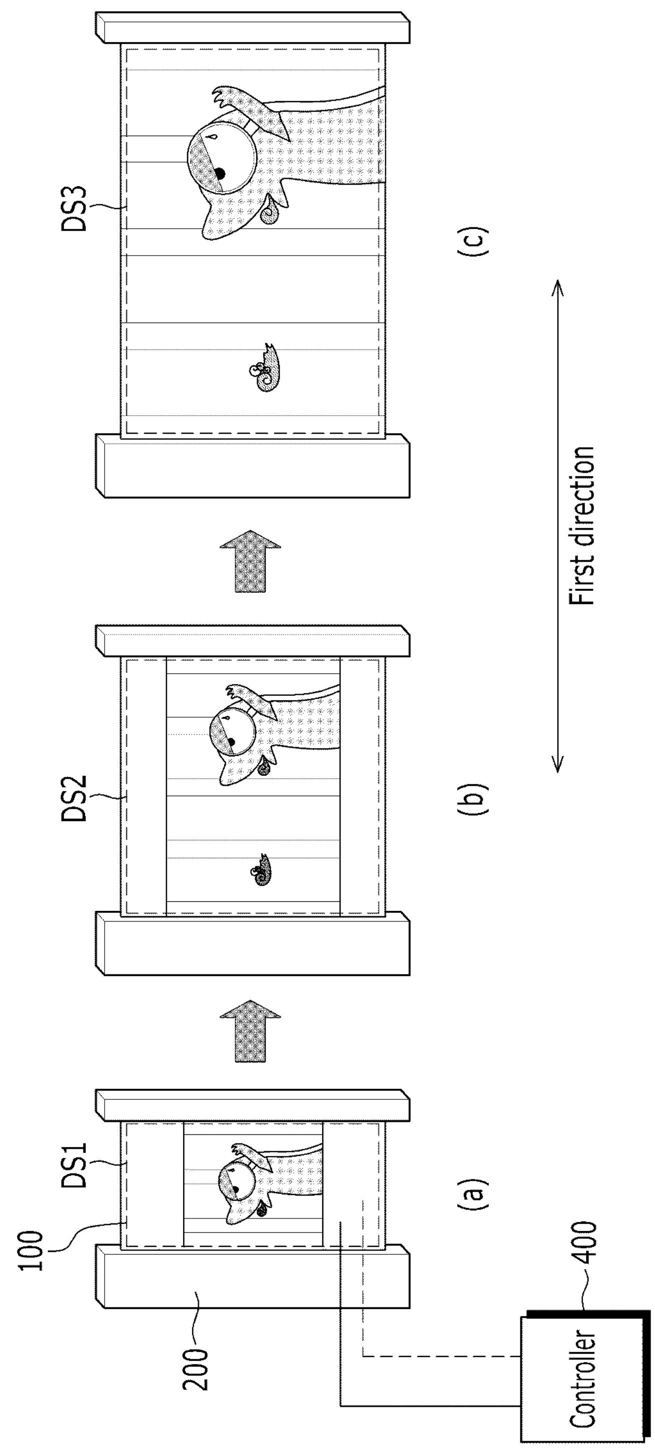
FIG. 4 is a view showing examples, in each of which an image displayed on the flexible display unit of the display device according to an embodiment.

FIG. 4 is a view showing an image displayed on the flexible display unit of the display device according to the first embodiment.

As shown in FIG. 4, after detecting the display area DA, the controller 400 changes the size of an image displayed on the flexible display panel 110 such that it corresponds to the detected display area DA.

In detail, as shown in FIG. 4(*a*), when the flexible display unit 100 is first drawn out in the first direction with respect to the housing 200 to expose a first display area DS1, the controller 400 detects the first display area DS1 based on the capacitance change of the capacitive touch panel 120 at the contact location where the capacitive touch panel 120 has been rolled up around the roll unit 300, and changes the size of the image such that the image displayed on the flexible display panel 110 corresponds to the first display area DS1, as mentioned above.

Also, as shown in FIG. 4(*b*), when the flexible display unit 100 is further drawn out in the first direction with respect to the housing 200 to expose a second display area DS2, which is larger than the first display area DS1, the controller 400 detects the second display area DS2 based on the capacitance change of the capacitive touch panel 120 at the contact location where the capacitive touch panel 120 has been rolled up around the roll unit 300, and changes the size of the image such that the image displayed on the flexible display panel 110 corresponds to the second display area DS2, as mentioned above, Also, as shown in FIG. 4(*c*), when the flexible display unit 100 is further drawn out in the first direction with respect to the housing 200 to expose a third display area DS3, which is larger than the second display area DS2, the controller 400 detects the third display area DS3 based on the capacitance change of the capacitive touch panel 120 at the contact location where the capacitive touch panel 120 has been rolled up around the roll unit 300, and changes the size of the image such that the image displayed on the flexible display panel 110 corresponds to the third display area DS3 as mentioned above.

As described above, in the display device according to the illustrated embodiments, the controller 400 detects the display area DA of the flexible display unit 100 exposed to the outside as the flexible display unit 100 is drawn into or out of the housing 200 based on the capacitance change of the capacitive touch panel 120 at the contact location where the flexible display unit 100 is drawn into or drawn out of the housing 200, and changes the size of an image displayed on the flexible display panel 110 such that the image corresponds to the display area DA, thereby displaying an image optimized to the flexible characteristics of the flexible display unit 100.

In particular, in the display device according to the illustrated embodiments, since the display area DA of the flexible display unit 100 exposed to the outside is determined by the controller 400 directly connected to the flexible display unit 100, although the exposed plane surface of the flexible display unit 100 is bent nonlinearly outside the housing 200, the exposed display area DA of the flexible display unit 100 outside the housing 200 can be accurately detected and the size of an image can be changed to correspond to the display area DA.

Namely, in the display device according to the illustrated embodiments, rather than sensing the display area DA after the flexible display unit 100 is drawn out of the housing 200, the controller 400 senses or measures the exposed display area DA of the flexible display unit 100 based on the capacitance of the capacitive touch panel 120 which is changing at the contact location as the flexible display unit 100 is drawn into or drawn out of the housing 200 in real time. Thus, although the exposed plane surface of the flexible display unit 100 is so flexible as to be bent nonlinearly, the exposed display area DA of the flexible display unit 100 can be accurately detected and an image having the size corresponding to the display area DA can be displayed.

In addition, in the display device according to the illustrated embodiments, instead of counting the number of rotations of the roll unit 300 to indirectly sense the display area DA of the flexible display unit 100 or sensing the display area DA of the flexible display unit 100 after the flexible display unit 100 is unrolled by using a distance measurement unit such as infrared rays, ultrasonic waves, or the like, in consideration of the flexible characteristics of the flexible display unit 100, the exposed display area DA of the flexible display unit 100 is determined based on the contact location at which the capacitance of the capacitive touch panel 120 changes as the flexible display unit 100 is drawn into or drawn out of the housing 200, whereby an image of an accurate size corresponding to the variable display area DA of the flexible display unit 100 is variably displayed on the flexible display unit 100. This enhances overall user satisfaction of the display device.

A display device according to embodiments will be described with reference to FIG. 5.

While explaining the illustrated embodiments, configurations or parts different from those of the aforementioned embodiments will be described, and configurations or parts same or similar to those of the aforementioned embodiments may be omitted for brevity. In explaining the illustrated embodiments, the same reference numerals as those of the aforementioned embodiments are used for the same elements for the sake of explanation.

Figure 5:
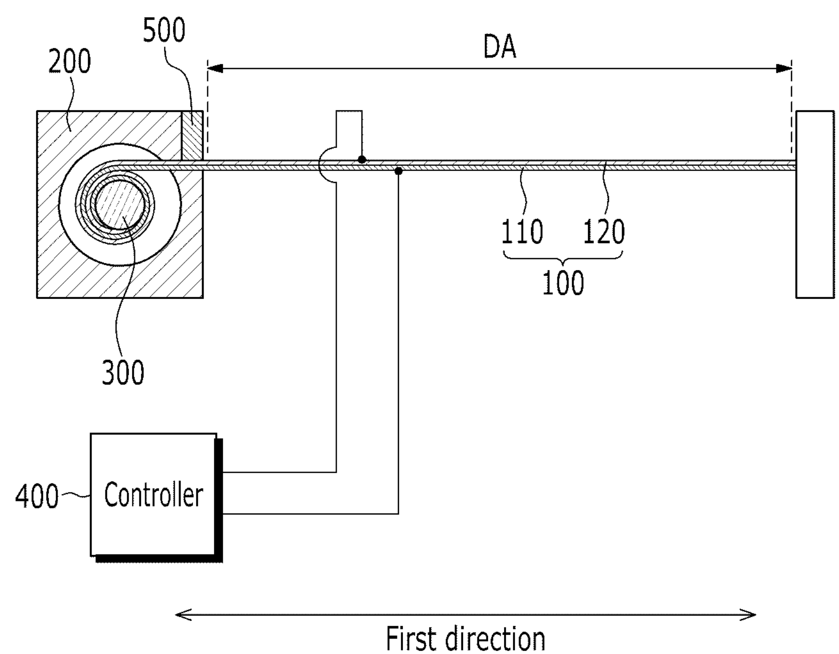
FIG. 5 is a view showing a display device according to an embodiment.

FIG. 5 is a view showing a display device according to some embodiments.

As shown in FIG. 5, the display device includes the flexible display unit 100, the housing 200, the roll unit 300, the controller 400, and a conductive contact unit 500 as a marker.

The flexible display unit 100 includes the flexible display panel 110 and the capacitive touch panel 120, and when the flexible display unit 100 is drawn into or drawn out of the housing 200, the capacitive touch panel 120 is brought into contact with the conductive contact unit 500.

In embodiments, the conductive contact unit 500 is positioned within or secured to the housing 200, and comes into contact with the capacitive touch panel 120 of the flexible display unit 100. The conductive contact unit 500 may have a brush-like shape or a cushion-like shape. By using the conductive contact unit 500 having a brush-like shape or a cushion-like shape, generation of a scratch on the capacitive touch panel 120 can be restrained when the conductive contact unit 500 comes into contact with the capacitive touch panel 120.

The controller 400 is connected to the capacitive touch panel 120 and the flexible display panel 110. The controller 400 measures or determines the display area DA based on capacitance of the capacitive touch panel 120 which changes at a location where the conductive contact unit 500 is brought into contact with the capacitive touch panel 120 when the flexible display unit 100 is drawn into or drawn out of the housing 200 by the roll unit 300, and changes the size of an image displayed on the flexible display panel 110 such that it corresponds to the detected display area DA.

The method for detecting the display area DA based on the capacitance of the capacitive touch panel 120 by the controller 400 will be described with reference to FIG. 6.

Figure 6:
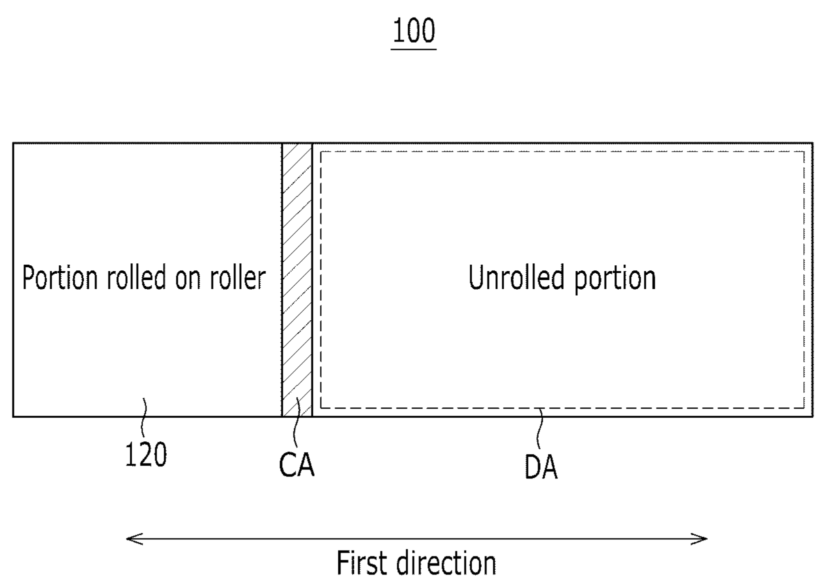
FIG. 6 is a view showing a flexible display unit of the display device according to an embodiment.

FIG. 6 is a view showing a flexible display unit of the display device according to the embodiments illustrated in FIG. 5.

As shown in FIGS. 5 and 6, when the flexible display unit 100 is rolled up or wound up around the roll unit 300 and drawn into the housing 200, the conductive contact unit 500 positioned within the housing 200 is brought into contact with the capacitive touch panel 120 and the capacitance of a contact area CA in contact with the conductive contact unit 500 of the capacitive touch panel 120 is changed.

The controller 400 detects a display area DA corresponding to an unrolled portion (which is located at the right side of the contact area in FIG. 6, and corresponds to a portion of the display panel outside the housing 200 when the flexible display panel is drawn out of the housing 200 in the first direction) based on the contact area CA having a capacitance which is changed as the capacitive touch panel 120 is in contact with the conductive contact unit 500. After detecting the display area DA, the controller changes the size of an image displayed on the flexible display panel 110 such that it corresponds to the display area DA.

As described above, in the display device according to the illustrated embodiments, the controller 400 detects the display area DA of the flexible display unit 100 exposed to the outside as the flexible display unit 100 is drawn into or out of the housing 200 based on the capacitance of the capacitive touch panel 120 which changes as the flexible display unit 100 is drawn into or drawn out of the housing 200, and adjusts the size of an image displayed on the flexible display panel 110 such that the image corresponds to the display area DA, thereby displaying an image optimized to the flexible characteristics of the flexible display unit 100.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:

a rollable display comprising a flexible display panel and a flexible touch panel positioned over a display surface of the flexible display panel, the rollable display further comprising a back surface facing away from the display surface;

a housing configured to enclose the rollable display while allowing the rollable display to move relative to the housing such that a portion of the rollable display is drawn out of the housing and retracted into the housing;

a marker provided on the back surface of the rollable display and configured to contact the flexible touch panel as the rollable display is rolled such that the display device recognizes the marker's contact on the flexible touch panel and determines how much the rollable display is drawn out of the housing based on a location of the marker's contact on the flexible touch panel; and at least one processor configured to adjust the size of an image displayed on the flexible display panel based on the determination of how much the rollable display is drawn out of the housing, wherein the marker is elongated along an edge of the rollable display and extends throughout a length of the flexible display along the edge.

2. The display device of claim 1, further comprising a shaft on which the at least part of the rollable display is wound into a roll portion, wherein the flexible touch panel comprises a non-overlapping portion which does not overlap with the flexible display panel, the non-overlapping portion having a length measured in a moving direction of the rollable display, wherein the length of the non-overlapping portion is the substantially same with that of the circumference of the shaft.

3. The display device of claim 1, wherein the marker has a stripe shape extending in a moving direction of the rollable display.

4. The display device of claim 1, wherein the at least one processor is configured to determine the size of an exposed portion of the rollable display using the location of the marker's contact such that the size of the image is adjusted using the computed size of the exposed portion.

5. The display device of claim 4, wherein the at least one processor is configured to determine the size of the exposed portion of the rollable display further using a distance between the contact location and the exposed portion measured in a moving direction of the rollable display.

6. The display device of claim 1, wherein the contact location is positioned within the housing.

7. The display device of claim 1, wherein the flexible touch panel comprises a capacitive touch panel, wherein the marker comprises an electrically conductive surface which is configured to touch the capacitive touch panel such that the capacitance of the touch panel changes at the contact location.

8. A method of operating a display device, the method comprising:

providing the display device of claim 1;

drawing the rollable display out of the housing such that a portion of the rollable display is exposed out of the housing;

computing a location on the rollable display at which the marker contacts the flexible touch panel; and processing the computed contact location to adjust the size of an image to be displayed on the exposed portion of the rollable display.

9. The method of claim 8, wherein processing comprises:

computing the size of the exposed portion based on the computed contact location; and adjusting the size of the image using the computed size of the exposed portion.

10. The method of claim 8, further comprising adjusting the resolution of the image to adjust the size of the image.

11. The method of claim 8, further comprising winding the rollable display to retract at least part of the exposed portion into the housing, wherein the contact location is changed while winding the rollable display.

12. The method of claim 8, wherein a portion of the rollable display is wound into a roll within the housing, wherein the marker touches the wound portion.

13. The method of claim 12, wherein the marker has a stripe shape extending in a moving direction of the rollable display.

14. The method of claim 8, wherein the marker is secured to the housing at a fixed position relative to the housing.

15. The method of claim 8, wherein the contact location is positioned within the housing while drawing the rollable display.

16. The method of claim 8, wherein the flexible touch panel comprises a capacitive touch panel, wherein the marker comprises an electrically conductive surface which touches the capacitive touch panel.

* * * * *